(12) United States Patent
Kennedy-Foster

(10) Patent No.: US 11,122,135 B2
(45) Date of Patent: Sep. 14, 2021

(54) LOCATION-BASED BEHAVIORAL MONITORING

(71) Applicant: CARRIER CORPORATION, Palm Beach Gardens, FL (US)

(72) Inventor: Ashley Kennedy-Foster, Henrietta, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/619,666

(22) PCT Filed: Jun. 8, 2018

(86) PCT No.: PCT/US2018/036704
§ 371 (c)(1),
(2) Date: Dec. 5, 2019

(87) PCT Pub. No.: WO2018/227120
PCT Pub. Date: Dec. 13, 2018

(65) Prior Publication Data
US 2020/0168020 A1 May 28, 2020

Related U.S. Application Data

(60) Provisional application No. 62/517,420, filed on Jun. 9, 2017.

(51) Int. Cl.
*H04L 29/08* (2006.01)
*H04W 4/029* (2018.01)
(Continued)

(52) U.S. Cl.
CPC .............. *H04L 67/22* (2013.01); *G06F 16/29* (2019.01); *G07C 9/257* (2020.01); *G08B 7/06* (2013.01);
(Continued)

(58) Field of Classification Search
CPC ........ H04L 67/18; H04L 67/22; H04W 4/021; H04W 4/029; H04W 4/023; H04W 4/33;
(Continued)

(56) References Cited

U.S. PATENT DOCUMENTS 7,769,207 B2 8/2010 Olivo, Jr. et al.
8,023,961 B2 9/2011 Yanagihara
(Continued)

FOREIGN PATENT DOCUMENTS

CN 102823283 A 12/2012
CN 106686544 A 5/2021

OTHER PUBLICATIONS

Notification of Transmittal of the International Search Report of International Application No. PCT/US2018/036704; Report dated Aug. 24, 2018; 6 pages.
(Continued)

*Primary Examiner* — Kwasi Karikari
(74) *Attorney, Agent, or Firm* — Cantor Colburn LLP

(57) ABSTRACT

A method of location-behavioral monitoring is provided. The method comprising: storing an access list associated with an identification credential; collecting historical location parameters associated with the identification credential; receiving schedule parameters associated with the identification credential; determining a predicted location schedule associated with the identification credential in response to the historical location parameters and schedule parameters; collecting location parameters associated with identification credential; and determining a risk rating associated with each location parameter in response to the predicted location schedule, location parameters, and the access list.

20 Claims, 3 Drawing Sheets

(51) Int. Cl.
*G06F 16/29* (2019.01)
*G07C 9/25* (2020.01)
*H04W 12/08* (2021.01)
*H04W 12/63* (2021.01)
*H04W 12/67* (2021.01)
*G08B 7/06* (2006.01)

(52) U.S. Cl.
CPC .......... *H04W 4/029* (2018.02); *H04W 12/08* (2013.01); *H04W 12/63* (2021.01); *H04W 12/67* (2021.01)

(58) Field of Classification Search
CPC .......... H04W 88/16; H04W 12/00503; H04W 12/06; H04W 12/08; H04W 40/18; H04W 4/38; H04W 4/02; H04W 4/025; H04W 4/026; H04W 4/027; H04W 4/44; H04W 4/80; H04W 52/0251; H04W 64/00
See application file for complete search history.

(56) References Cited

U.S. PATENT DOCUMENTS

| | | | |
|---|---|---|---|
| 8,478,642 B2 | 7/2013 | Dey et al. | |
| 8,577,392 B1 | 11/2013 | Pai et al. | |
| 8,606,497 B2 | 12/2013 | Doherty et al. | |
| 8,626,443 B2 | 1/2014 | Robertson et al. | |
| 8,989,880 B2 | 3/2015 | Wohl et al. | |
| 9,317,813 B2 | 4/2016 | McGavran et al. | |
| 9,574,894 B1 | 2/2017 | Karakotsios et al. | |
| 9,589,230 B1 | 3/2017 | Thiagarajan et al. | |
| 2011/0016363 A1* | 1/2011 | Washio | H04M 3/36 714/57 |
| 2011/0057790 A1 | 3/2011 | Martin et al. | |
| 2011/0099047 A1 | 4/2011 | Weiss et al. | |
| 2012/0066168 A1 | 3/2012 | Fadell et al. | |
| 2012/0100869 A1 | 4/2012 | Liang et al. | |
| 2013/0295963 A1 | 11/2013 | Sen | |
| 2014/0128105 A1 | 5/2014 | Su et al. | |
| 2014/0136104 A1 | 5/2014 | Spears et al. | |
| 2014/0358437 A1 | 12/2014 | Fletcher | |
| 2015/0073980 A1* | 3/2015 | Griffin | G06Q 20/3223 705/39 |
| 2015/0123794 A1 | 5/2015 | Hamalainen et al. | |
| 2015/0324816 A1 | 11/2015 | Unser et al. | |
| 2016/0078699 A1 | 3/2016 | Kalb et al. | |
| 2016/0132030 A1* | 5/2016 | Marti | H04L 12/2829 700/275 |
| 2017/0197568 A1* | 7/2017 | DeCia | H04W 52/0258 |

OTHER PUBLICATIONS

Written Opinion of the International Searching Authority of International Application No. PCT/US2018/036704; Report dated Aug. 24, 2018; 8 pages.

First Office Action for Application No. 201880051488.7; Office Action dated May 7, 2021; Office Action Received Jul. 8, 2021; 10 pages.

* cited by examiner

LOCATION-BASED BEHAVIORAL MONITORING

CROSS-REFERENCE TO RELATED APPLICATIONS

This application is based on International Application No. PCT/US2018/036704 filed Jun. 8, 2018, which claims priority to U.S. Provisional Patent Application Ser. No. 62/517,420 filed Jun. 9, 2017, both of which are incorporated herein by reference in their entirety.

BACKGROUND

The subject matter disclosed herein generally relates to the field of location-based monitoring, and more particularly to an apparatus and method for detecting behavioral variations with location based monitoring.

Existing location-based monitoring systems are commonly set up such that access devices (such as door locks) restrict access to certain locations, however these current systems have their limitations. For instance, they fail to prevent tailgating, specifically when one person unlocks a door and a second person walks through the open door behind the first person.

BRIEF SUMMARY

According to one embodiment, a method of location-behavioral monitoring is provided. The method comprising: storing an access list associated with an identification credential; collecting historical location parameters associated with the identification credential; receiving schedule parameters associated with the identification credential; determining a predicted location schedule associated with the identification credential in response to the historical location parameters and schedule parameters; collecting location parameters associated with identification credential; and determining a risk rating associated with each location parameter in response to the predicted location schedule, location parameters, and the access list.

In addition to one or more of the features described above, or as an alternative, further embodiments may include activating an alarm when the risk rating is above a selected risk rating.

In addition to one or more of the features described above, or as an alternative, further embodiments may include displaying on a map the risk rating associated with each location parameter.

In addition to one or more of the features described above, or as an alternative, further embodiments may include displaying on a timeline the risk rating associated with each location parameter.

In addition to one or more of the features described above, or as an alternative, further embodiments may include where collecting location parameters associated with identification credential further comprises: detecting location parameters through an access request transmitted to an access device, wherein the access request is associated with the identification credential.

In addition to one or more of the features described above, or as an alternative, further embodiments may include where collecting location parameters associated with identification credential further comprises: detecting location parameters through location based tracking of a requesting device associated with the identification credential.

In addition to one or more of the features described above, or as an alternative, further embodiments may include wherein collecting location parameters associated with identification credential further comprises: detecting location parameters using facial recognition.

According to another embodiment a location-based behavioral monitoring system is provided. The system comprising: a storage device to store: an access list associated with an identification credential, historical location parameters associated with the identification credential, schedule parameters associated with the identification credential, and location parameters associated with the identification credential; and a risk management system coupled to the storage device, the risk management system including: a location schedule prediction module to determine a predicted location schedule associated with the identification credential in response to the historical location parameters and schedule parameters; and a location risk analysis module to determine a risk rating associated with each location parameter in response to the predicted location schedule, location parameters, and the access list.

In addition to one or more of the features described above, or as an alternative, further embodiments may include an alarm to activate when the risk rating is above a selected risk rating.

In addition to one or more of the features described above, or as an alternative, further embodiments may include a user device to generate a map displaying the risk rating associated with each location parameter on the map.

In addition to one or more of the features described above, or as an alternative, further embodiments may include a user device to display a timeline of the risk rating associated with each location parameter.

In addition to one or more of the features described above, or as an alternative, further embodiments may include an access device to detect location parameters through access requests transmitted to the access device, wherein the access requests is associated with the identification credential.

In addition to one or more of the features described above, or as an alternative, further embodiments may include a requesting device associated with the identification credential, wherein the requesting device the location parameters are detected through location based tracking of the requesting device.

In addition to one or more of the features described above, or as an alternative, further embodiments may include a sensor to detect location parameters using facial recognition.

According to another embodiment, a computer program product tangibly embodied on a computer readable medium is provided. The computer program product including instructions that, when executed by a processor, cause the processor to perform operations comprising: storing an access list associated with an identification credential; collecting historical location parameters associated with the identification credential; receiving schedule parameters associated with the identification credential; determining a predicted location schedule associated with the identification credential in response to the historical location parameters and schedule parameters; collecting location parameters associated with identification credential; and determining a risk rating associated with each location parameter in response to the predicted location schedule, location parameters, and the access list.

In addition to one or more of the features described above, or as an alternative, further embodiments may include where the operations further comprise: activating an alarm when the risk rating is above a selected risk rating.

In addition to one or more of the features described above, or as an alternative, further embodiments may include where the operations further comprise: displaying on a map the risk rating associated with each location parameter.

In addition to one or more of the features described above, or as an alternative, further embodiments may include where the operations further comprise: displaying on a timeline the risk rating associated with each location parameter.

In addition to one or more of the features described above, or as an alternative, further embodiments may include where collecting location parameters associated with identification credential further comprises: detecting location parameters through an access request transmitted to an access device, wherein the access request is associated with the identification credential.

In addition to one or more of the features described above, or as an alternative, further embodiments may include where collecting location parameters associated with identification credential further comprises: detecting location parameters through location based tracking of a requesting device associated with the identification credential.

Technical effects of embodiments of the present disclosure include using location-based tracking to determine future movements and identify abnormal behavior.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Various embodiments of the present disclosure are related to multi-dimensional location-based behavioral monitoring and analysis of one or more persons. Embodiments can include establishing a continuous source of time and location data points for individual cardholders augmented by ancillary data like calendar events and time and attendance data, a model can be constructed that can be used to create a baseline picture of a cardholder's habits and routines and then predict future behavior and determine whether that behavior is abnormal. Advantageously, the embodiments disclosed herein help detect patterns, behaviors, and anomalies that human observation and traditional access control typically fail to detect.

Figure 1:
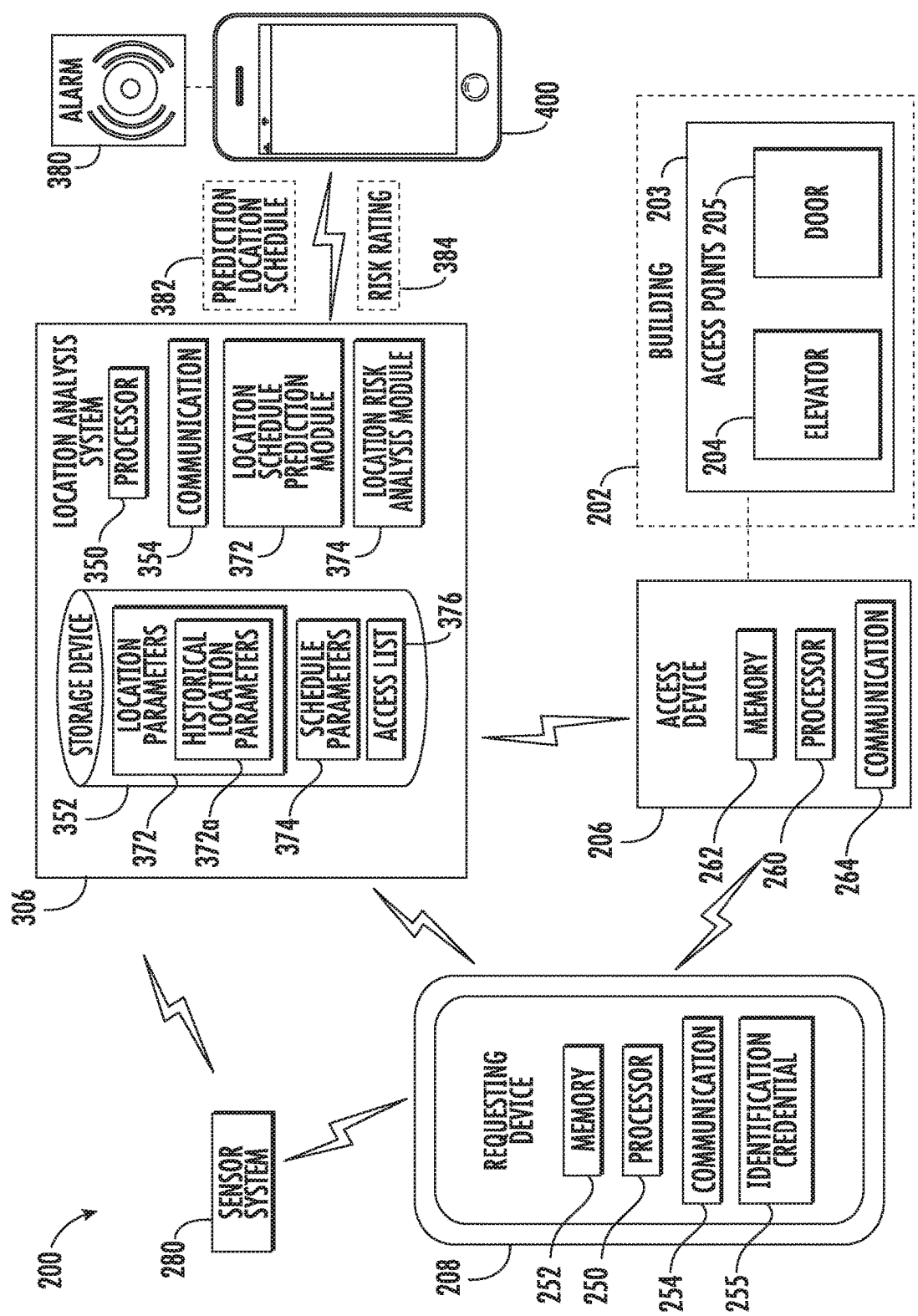
FIG. 1 illustrates a schematic view of a location-based behavioral monitoring system, in accordance with an embodiment of the disclosure.

FIG. 1 depicts a location-based behavioral monitoring system 200 in an example embodiment. The location-based behavioral monitoring system 200 includes at least one requesting device 208. The requesting device 208 may belong to an employee and/or resident of a building 202. In an example, the requesting device 208 may be an access card or a cellular phone. The requesting device 208 may be presented to an access device 206 to grant/deny access to access points 203, such as for example an elevator 204 or a door 205. The door 205 and an elevator 204 may be installed at the building 202.

In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance devices, such as the elevator 204. Persons entering the building 202 may be required to enter a door 205. In another non-limiting embodiment, the door 205 may be outside of a building, such as, for example a gate. The door 205 may include but is not limited to a door in a wall of the building 202, a door on the outside of the building 202, a garage door, a parking lot access gate, a turnstile, a car door, a fence gate, or similar access point known to one of skill in the art.

The access points 203 may be operably connected to one or more access devices 206. The access device 206 may be configured to control access to the access points 203, such as, for example an elevator 204 and a door 205. Although only one elevator 204 is shown in FIG. 1, it is understood that any number of elevators 204 may be used in the location-based behavioral monitoring system 200. It is understood that other components of the elevator 204 (e.g., elevator car, doors, drive, counterweight, safeties, etc.) are not depicted for ease of illustration. It is also understood that each elevator 204 may utilize one or more access devices 206. In an example, there may be an access device located on each floor of the building 202 located proximate an elevator shaft. Further, although only one door 205 is shown in FIG. 1, it is understood that any number of doors 205 may be used in the location-based behavioral monitoring system 200. It is understood that other components of doors 205 are not depicted for ease of illustration (e.g., locks). It is also understood that each door 205 may utilize one or more access devices 206.

In a non-limiting example, the access device 206 may be a door reader or door strike. The access device 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the access device 206 including executable instructions stored therein, for instance, as firmware. The communication module 264 may implement one or more communication protocols as described in further detail herein.

Also shown in FIG. 1 is the requesting device 208. The requesting device 208 is configured to store a unique identification credential 255 that may be shared with the access device 206 when the requesting device 208 is presented to the access device 206. The requesting device 208 may be an access card embedded with the unique identification credential 255. Alternatively, the requesting device 208 may be a mobile computing device that is typically carried by a person, such as, for example a phone, PDA, smart watch, tablet, laptop, etc. In an embodiment, the requesting device 208 is a mobile computing device. The requesting device 208 may include a processor 250, memory 252 and communication module 254 as shown in FIG. 1. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the requesting device 208 including executable instructions stored therein, for instance, as firmware. The communication module 254 may implement one or more communication protocols as described in further detail herein.

The location of the person carrying the requesting device 208 is continuously tracked. Each time a requesting device 208 is presented to an access device 206, a location parameter 372 is generated and transmitted to a location analysis system 306. The location parameter 372 is the location of the access device 206 at the time the requesting device 208 was presented to the access device 206 at that location. The location parameter 372 includes a time and location of the requesting device 208. The location parameters 372 help identify where the requesting device 208 was located throughout the course of the day and at what time. The location of the requesting device 280 may also be tracked through a sensor system 280 without the need to be presented to an access device. In an example, the sensor system 280 may utilize interconnected wireless detectors to continually communicate with the requesting device 208 and identify the location of the requesting device 208. These interconnected wireless detectors may be communicating through Wi-Fi and/or Bluetooth with the communication module 254 to continuously monitor the location of the requesting device 208. In another example, the sensor system 280 may track the location of the requesting device 208 using visual recognition to track the person's face who is carrying the requesting device 208.

The requesting device 208 and the access device 206 communicate with one another. For example, the requesting device 208 and the access device 206 may communicate with one another when proximate to one another (e.g., within a threshold distance). For example, the requesting device 208 may communicate with the access device 206 using near field communications (NFC). In other embodiments, the location of the requesting device 208 relative to the access device 206 may be established communication various technologies including GPS, triangulation, or signal strength detection, by way of non-limiting example. In example embodiments, the requesting device 208 communicates with the access device 206 over multiple independent wired and/or wireless networks. Embodiments are intended to cover a wide variety of types of communication between the requesting device 208 and access device 206, and embodiments are not limited to the examples provided in this disclosure. For example, the requesting device 208 and the access device 206 may communicate over a wireless network, such as 802.11x (WiFi), short-range radio (Bluetooth), cellular, satellite, etc.

Also shown in FIG. 1 is the location analysis system 306. The location analysis system collects the location parameters 372 and saves the location parameters 372 within a storage device 352. The storage device 352 is an example of a non-transitory computer readable storage medium tangibly embodied in or operably connected to the authorization service including executable instructions stored therein, for instance, as firmware. The storage device 352 may be a single storage medium or a series of interconnected storage mediums. After a selected amount of time the location parameters 372 are saved as historical location parameters 372a. Also, saved within the storage device 352 are schedule parameters 374. Schedule parameters 374 depict when and where the person possessing the requesting device 208 is expected to be a particular day according to their calendar. For example, the schedule parameters 374 may be imported from a person's Microsoft Outlook Calendar or any other similar electronic calendars.

Also saved within the storage device 352 is an access list 376. The access list 376 depicts when and where a requesting device 208 is authorized to access. For example, the requesting device 208 may only be authorized to enter certain rooms within a building 202. In another example, the requesting device 208 may only be authorized to access the building during a particular shift. These access permissions are established and associated with the identification credential 255 of the requesting device 255 within the access list 376.

The location analysis system 306 may include a processor 350 and communication module 354 as shown in FIG. 1. The processor 350 can be any type or combination of computer processors, such as a microprocessor, microcontroller, digital signal processor, application specific integrated circuit, programmable logic device, and/or field programmable gate array. The communication module 354 may implement one or more communication protocols as described in further detail herein.

The communication module 354 of the location analysis system 306 may communicate with the sensor system 280, the requesting device 208, and the access device 206 over a wireless network, such as 802.11x (WiFi), short-range radio (Bluetooth), cellular, satellite, etc. In some embodiments, the location analysis system 306 may include, or be associated with (e.g., communicatively coupled to) a networked element, such as kiosk, beacon, lantern, bridge, router, network node, building intercom system, etc. The networked element may communicate with the sensor system 280, the requesting device 208, and the access device 206 using one or more communication protocols or standards. For example, the networked element may communicate with the sensor system 280, the requesting device 208, and the access device 206 using near field communications (NFC). In other embodiments, the sensor system 280, the requesting device 208, and the access device 206 may establish communication with a location analysis system 306 that is not associated with a networked element in the building 202. This connection may be established with various technologies including GPS, 802.11x (WiFi), cellular, or satellite, by way of non-limiting example. In example embodiments, the location analysis system 306 may communicate over multiple independent wired and/or wireless networks. Embodiments are intended to cover a wide variety of types of communication for the location analysis system 306 and embodiments are not limited to the examples provided in this disclosure.

The location analysis system 306 also includes a location schedule prediction module 372 and a location risk analysis module 374. The location schedule prediction module 372 is configured to determine a predicted location schedule 382 associated with the identification credential 255 in response to the historical location parameters 372a and schedule parameters 374. The location schedule prediction module 372 may determine the predicted location schedule 382 within a specific event probability 434 (see FIG. 2). In an example, based on historical location parameters 372a, the location prediction module 372 may determine within a 90% probably that the person will be located within the cafeteria at 11:30 on Tuesday. In another example, based on historical location parameter 372a and schedule parameters 374 the location prediction module 372 may determine that a person will be attending the 8:00 daily meeting on the other side of the building that they never miss. The predicted location schedule 382 may be transmitted to a user device 400 where it may be displayed via a graphical user interface 402 (see FIG. 2). The user device 400 may be a desktop computer, laptop computer, mobile phone, tablet, smart watch, television, or any other device capable of displaying date known to one of skill in the art.

The location risk analysis module 374 is configured to determine a risk rating 384 associated with each location parameter 272 in response to the predicted location schedule, location parameters 372, and the access list 376. The risk rating 384 may be transmitted to a user device 400 where the risk rating 384 may be displayed on a map and/or list. In an embodiment, an alarm 380 may be activated when the risk rating 384 is above a selected risk rating. Various other factors time and location may factor into the risk rating 384. In one example, as the person starts to vary from the predicted location schedule 382 then the location analysis system 306 may not activate an alarm 380 unless they are traveling towards a restricted area, such as, for example, a classified room. In another example, if daytime employee shows up at a building 202 at 3:00 AM, an alarm 380 might be activated to alert security of suspicious behavior. The alarm 380 may be audible and/or visual. The alarm may appear on the user device 380.

Figure 2:
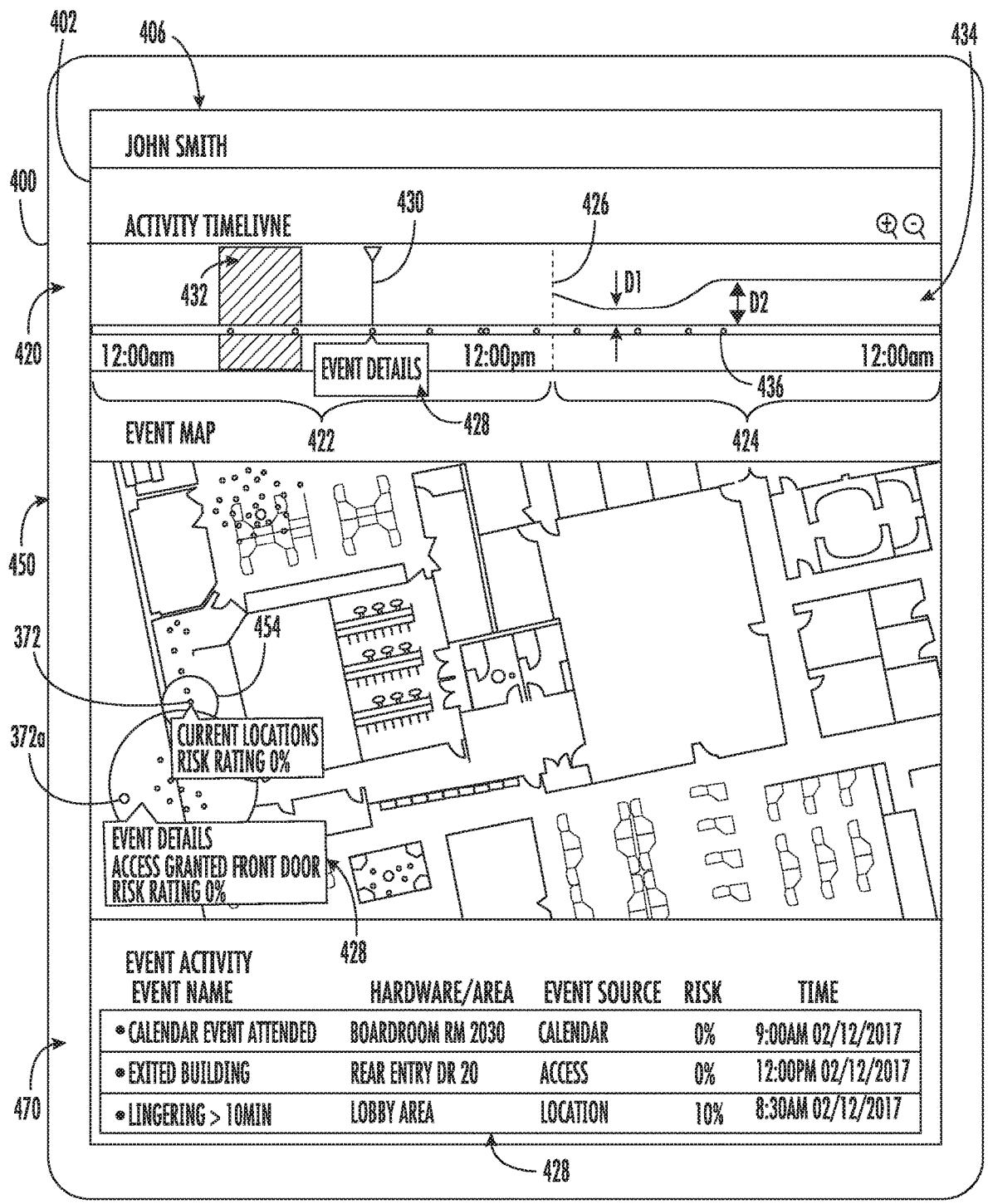
FIG. 2 illustrates a schematic view of a graphical user interphase of a user device for use with the location-based behavioral monitoring system of FIG. 1, in accordance with an embodiment of the disclosure.

Referring now to FIG. 2, while referencing components of FIG. 1. FIG. 2 shows a graphical user interface 402 of a user device 400 in communication with the location analysis system 306. The user device 400 may be in wired and/or wireless communication with the location analysis system 306. The wireless connection may include Bluetooth, 802.11x (WiFi), cellular, or satellite, by way of non-limiting example. The user interface 402 may display the information of a particular user 406 associated with a specific identification credential 255. The user interface 402 may display an activity timeline 420 showing past activity 422 and future planned activity 424. A current time line 426 separates the past activity 422 and future planned activity 424. The past activity 422 is compiled from the historical location parameters 372 and may include event details 428 such as for example location, time, and risk rating 384. A user of the graphical user interface 402 may utilize a scrubber 430 to examine each event details. The graphical user interface 402 may highlight sections 432 on the activity timeline 420 where the risk rating 384 exceeds a selected risk rating. The future planned activity 424 is compiled from the predicted location schedule 382 determined by the location schedule prediction module 372. The future planned activity 424 may include predicated events 436 and an expected event probability 434. The expected event probability 434 may be low as seen by D1 or high as seen by D4. In an example, if an employee leaves every day at 4:00 PM for three months straight, the expected event probability 434 for that to occur again would be high.

The user interface 402 may display an event map 450 including historical location parameters 372a and location parameters 372. The event details 428 may be shown on the map for the historical location parameters 372a and the location parameters 372. As mentioned above, event details 428 may include but are not limited to location, time, and risk rating 384 of each historical location parameters 372a and location parameter 372. Each of the historical location parameters 372a and location parameters 372 may include a halo 454 indicated whether the specific parameter 372, 372a indicates normal behavior or abnormal behavior.

The user interface 402 may display an event activity chart 470 that lists textually the historical location parameters 372a and the location parameters 372. The event details 428 may be shown in the event activity chart 470 for each of the historical location parameters 372a and the location parameters 372. As mentioned above, event details 428 may include but are not limited to location, time, and risk rating 384 of each historical location parameter 372a and location parameter 372.

Figure 3:
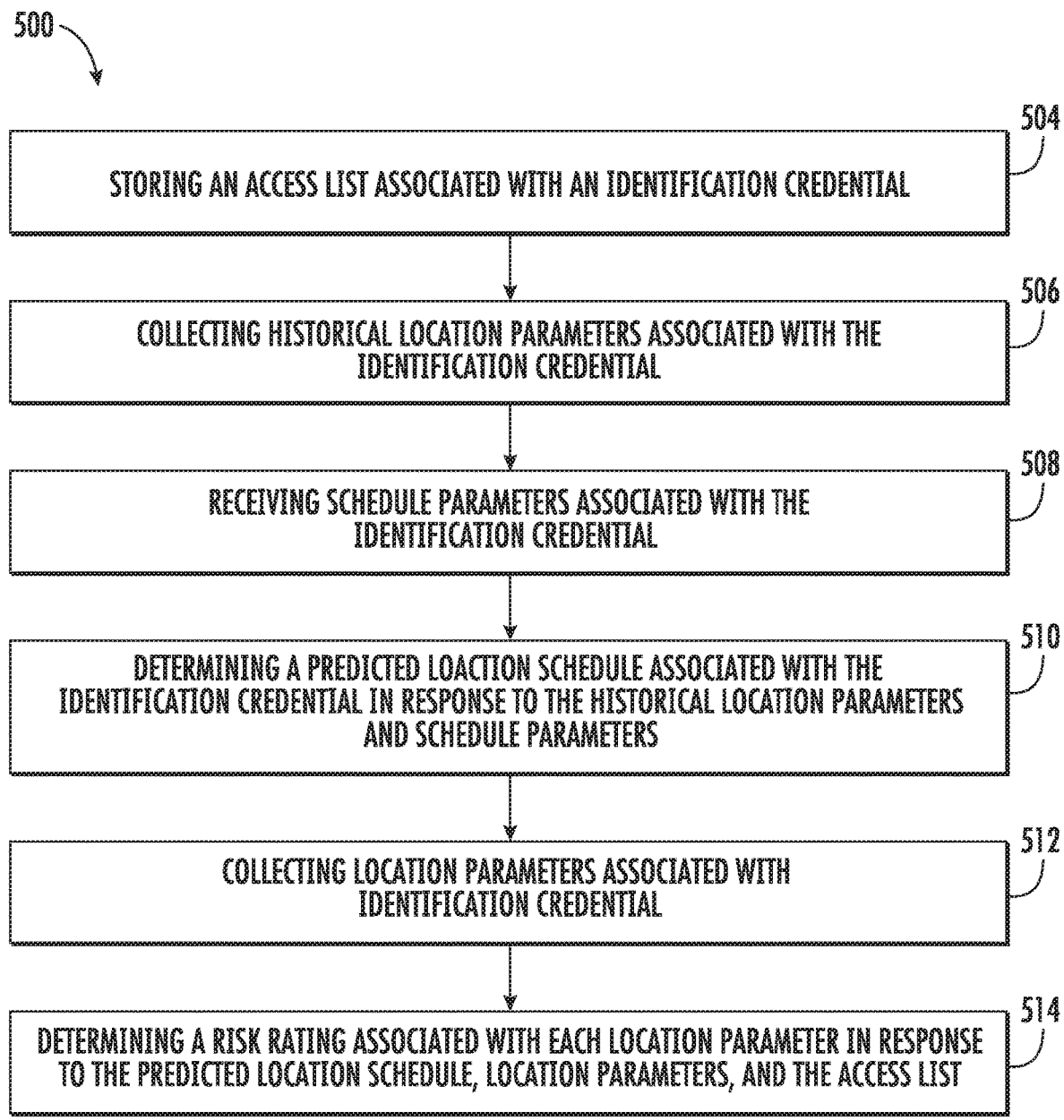
FIG. 3 is a flow diagram illustrating a method of location-based monitoring, according to an embodiment of the present disclosure.

Referring now to FIG. 3, while referencing components of FIG. 1. FIG. 3 shows a flow diagram illustrating a method 500 of location-based monitoring. At block 504, an access list 376 associated with an identification credential 255 is stored. At block 506, historical location parameters 372a associated with the identification credential 255 are collected. At block 508, schedule parameters 374 associated with the identification credential 255 are received. At block 510, a predicted location schedule 382 associated with the identification credential 255 is determined in response to the historical location parameters 372a and schedule parameters 374. At block 512, location parameters 372 associated with identification credential 255 are collected. At block 514, a risk rating 384 associated with each location parameter 372 is determined in response to the predicted location schedule 382, location parameters 372, and the access list 376. The method 500 may also include activating an alarm 380 when the risk rating 384 is above a selected risk rating. The method 500 may further include, displaying on a timeline 420 or a map 450 the risk rating 384 associated with each location parameter 372.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of location-behavioral monitoring, the method comprising:
    storing an access list associated with an identification credential,
    wherein the access list is access permissions depicting when and where the identification credential is authorized to access;
    collecting historical location parameters associated with the identification credential;
    receiving schedule parameters associated with the identification credential;
    determining a predicted location schedule associated with the identification credential in response to the historical location parameters and schedule parameters;
    collecting location parameters associated with identification credential; and
    determining a risk rating associated with each location parameter in response to the predicted location schedule, location parameters, and the access list.

2. The method of claim 1, further comprising:
    activating an alarm when the risk rating is above a selected risk rating.

3. The method of claim 1, further comprising:
    displaying on a map the risk rating associated with each location parameter.

4. The method of claim 1, further comprising:
    displaying on a timeline the risk rating associated with each location parameter.

5. The method of claim 1, wherein collecting location parameters associated with identification credential further comprises:
    detecting location parameters through an access request transmitted to an access device, wherein the access request is associated with the identification credential.

6. The method of claim 1, wherein collecting location parameters associated with identification credential further comprises:
    detecting location parameters through location based tracking of a requesting device associated with the identification credential.

7. The method of claim 1, wherein collecting location parameters associated with identification credential further comprises:
    detecting location parameters using facial recognition.

8. A location-based behavioral monitoring system comprising:
    a storage device to store: an access list associated with an identification credential, historical location parameters associated with the identification credential, schedule parameters associated with the identification credential, and location parameters associated with the identification credential, wherein the access list is access permissions depicting when and where the identification credential is authorized to access; and
    a risk management system coupled to the storage device, the risk management system including:
    a location schedule prediction module to determine a predicted location schedule associated with the identification credential in response to the historical location parameters and schedule parameters; and
    a location risk analysis module to determine a risk rating associated with each location parameter in response to the predicted location schedule, location parameters, and the access list.

9. The location-based behavioral monitoring system of claim 8, further comprising:
    an alarm to activate when the risk rating is above a selected risk rating.

10. The location-based behavioral monitoring system of claim 8, further comprising:
    a user device to generate a map displaying the risk rating associated with each location parameter on the map.

11. The location-based behavioral monitoring system of claim 8, further comprising:
    a user device to display a timeline of the risk rating associated with each location parameter.

12. The location-based behavioral monitoring system of claim 8, further comprising:
    an access device to detect location parameters through access requests transmitted to the access device, wherein the access requests is associated with the identification credential.

13. The location-based behavioral monitoring system of claim 8, further comprising:
    a requesting device associated with the identification credential, wherein the requesting device the location parameters are detected through location based tracking of the requesting device.

14. The location-based behavioral monitoring system of claim 8, further comprising:
    a sensor to detect location parameters using facial recognition.

15. A computer program product tangibly embodied on a computer readable medium, the computer program product including instructions that, when executed by a processor, cause the processor to perform operations comprising:
    storing an access list associated with an identification credential, wherein the access list is access permissions depicting when and where the identification credential is authorized to access;
    collecting historical location parameters associated with the identification credential;
    receiving schedule parameters associated with the identification credential;

determining a predicted location schedule associated with the identification credential in response to the historical location parameters and schedule parameters;

collecting location parameters associated with identification credential; and determining a risk rating associated with each location parameter in response to the predicted location schedule, location parameters, and the access list.

16. The computer program product of claim 15, wherein the operations further comprise:

activating an alarm when the risk rating is above a selected risk rating.

17. The computer program product of claim 15, wherein the operations further comprise:

displaying on a map the risk rating associated with each location parameter.

18. The computer program product of claim 15, wherein the operations further comprise:

displaying on a timeline the risk rating associated with each location parameter.

19. The computer program product of claim 15, wherein collecting location parameters associated with identification credential further comprises:

detecting location parameters through an access request transmitted to an access device, wherein the access request is associated with the identification credential.

20. The computer program product of claim 15, wherein collecting location parameters associated with identification credential further comprises:

detecting location parameters through location based tracking of a requesting device associated with the identification credential.

* * * * *